INVENTOR.
ERIK BJORN DAHLIN

3,532,862
METHOD FOR ADJUSTING CONTROLLER GAIN TO CONTROL A PROCESS
Erik Bjorn Dahlin, Saratoga, Calif., assignor to International Business Machines Corporation, Armonk, N.Y., a corporation of New York
Filed Jan. 13, 1967, Ser. No. 609,108
Int. Cl. G05b 11/36
U.S. Cl. 235—151.1                                  8 Claims

ABSTRACT OF THE DISCLOSURE

A method for controlling a process including initially tuning the process to a desired operating level, establishing a standard process gain value, and thereby a standard control loop gain value, is disclosed. Subsequently, a second process gain value is determined by integrating the effect of a test signal on process output. Adjustment of the controller gain can then be made to maintain loop gain constant.

BACKGROUND OF THE INVENTION

This invention relates to the control of physical processes. More particularly, it relates to a method of determining the gain of a physical process and utilizing that gain to tune an associated analog or digital controller to an optimum setting so as to more precisely adjust certain process variables.

In controlling physical processes, it is necessary to measure and adjust certain process variables such as temperature, pressure, flow rate, etc. The interrelationship between those variables determines a value referred to in the prior art as process gain. The term "process gain" can be defined several different ways, but in essence it measures the change in process output (or controlled variable) in relation to a change in an input (or manipulated) variable.

In order to control physical processes, the gain of an analog or digital controller providing feedback control of the process should also be evaluated and controlled. It should be set to a value which makes the process gain and controller gain product (namely, loop gain) the same regardless of how the process gain itself varies. In other words, the controller gain must compensate for changes in the process gain.

A problem faced by the prior art was in determining and setting controller gain so as to precisely compensate for changes in process gain.

Determining and setting a controller gain is a difficult project when done according to the teachings of the prior art. The process gain can be determined by looking at a record of the process input and output values (if kept), but that is both a time-consuming and difficult task. It is still necessary to somehow or other determine what the controller gain should be. Further, the noted method is inaccurate since there may be at least two unidentifiable reasons for controlled variables exhibiting wide excursions:

(1) The disturbance introduced to the process may have been large; or
(2) The controller may have been tuned poorly.

Even if the controller is tuned in a more or less satisfactory manner, there is still some question as to whether the optimum (as opposed to a satisfactory) setting for the controller gain has been determined.

As still another problem in determining and setting gain, the gain in process can change due to a number of phsyical factors; as just one example, the corrosion or abrasion of heat conducting surfaces may result in a process gain change. However, it is still necessary to insure that any control action taken will be the proper action.

For these reasons, a concept known as adaptive control came into existence. Behind this concept lies the principle of making adjustments to one or more process parameters in accordance with the condition of the process at a given moment so as to insure operation of the process at an optimum level.

Adpative control, although attractive, is not always the best type of control for all applications. It is generally rather complex from the theoretical viewpoint; i.e., it is not always the easiest to implement. Also, the equipment necessary for practicing additive control is sometimes complex. Thus, some balance between the sophisticated adaptive control and the more "classical" type of control must be reached.

Accordingly, it is a general object of this invention to overcome the disadvantages of prior art process control methods requiring gain determination.

A particular object of this invention is to provide an improved method for determining the present gain of a process in a process control method.

A more particular obejct of this invention is to provide an improved method of process control wherein the present gain of a process and the best gain for its associated controller are determined.

Still another object of this invention is to provide an improved method for controlling a process.

Yet another object of this invention is to provide an improved method for controlling the loop gain of a process with its associated controller.

A further object of this invention is to provide an improved method for determining the ratio of the present gain in a process to some established gain for that process.

Still another object of this invention is to provide an improved method of process control wherein process gain is determined and then an indication of the quantitative change necessary to maintain some predetermined control loop gain is generated.

SUMMARY OF THE INVENTION

Briefly stated, then, my invention comprises a method for controlling a process wherein it is necessary to determine the present gain of that process. Initially, a standard measurement of the process output, and correspondingly its gain, in response to a certain test signal input must be obtained when the process is operating in a tuned, or desired, mode. This is accomplished by the steps of tuning the process to some desired mode of operation, operating the process without closed loop control (that is, removing the controller from the process), introducing a test signal, or transient, to the process, generating a signal representing a change in process output and then integrating that signal. A first integral value is thereby obtained and provides a standard value for subsequent utilization in the novel method of my invention. This standard value is stored in some storage medium, either machine or human, and subsequently used as a reference. The process is returned to closed loop control. At a later time, the process is open looped and a second known test signal input, of the same form as the first input, is applied to the process. A signal representing the output change produced by the second test signal is generated, and that signal is then integrated. A second integral value is thus produced. The second integral so obtained is compared to the first, or standard, integral; the first integral is referred to as a standard integral, since it may be employed repeatedly without recalculation in subsequent gain determination operations. The ratio of the second integral to the first integral is calculated; it is a direct measure of the ratio of the gain of the process now to the gain of the process under the reference condition. That measure can be displayed or made available to associated apparatus in the form of a signal for further control action; e.g., setting the gain of an associated analog controller so as to return the loop gain to the value it had when the process was initially tuned. Control signals are then generated and the value of the measured variable can be adjusted.

My inventive concept offers a number of attractive advantages. Using the method of this invention, it is possible to obtain an accurate determination of process gain with a minimum of additional equipment. The inventive method is particularly applicable to those processes where a great degree of sophistication in the control operation is not required; for example, in the control of Fourdrinier machine dryers. Although the system need be operated in an open loop manner while gain determination is being accomplished, any adverse effect of that operation on the associated process is minimized. A most important advantage is the high accuracy of this method even at very small test signal amplitudes; the required perturbation of the process is thus quite small. The gain measurements obtained in accordance with the teachings of this invention may be provided to associated apparatus for automatically initiating, or implementing, the necessary change of controller gain. Similarly, the method is equally well suited for utilization with a digitally-supervised analog controller or a direct digital controller. Alternatively, the gain determination so made can be displayed so that an operator can make the necessary adjustments to the input variables. The invention is thus applicable to a computer-aided, but manually implemented control method.

Summarizing the advantages of this invention, perhaps its main value lies in its ability to provide an accurate and timely evaluation of process gain and loop gain. All this is accomplished by utilizing a relatively short and simple method and by utilizing very simple equipment. The ambiguity present in the prior art control loop behavior evaluation methods mentioned earlier is removed, and the multiple experiments needed in current manual gain determinations are similarly eliminated. This method accomplishes the noted goals without going to the mechanisms and operations of prior art adaptive tuning techniques. Applying the method to a paper machine dryer requires a total time of roughly two to five minutes, whereas some methods of the prior art require at least two hours and necessitate greater process disturbances than the instant invention.

The foregoing and other objects, features and advantages of this invention will be apparent from the following more detailed description of preferred embodiments of the invention, as illustrated in the accompanying drawings.

DESCRIPTION OF EMBODIMENTS

Figure 1:
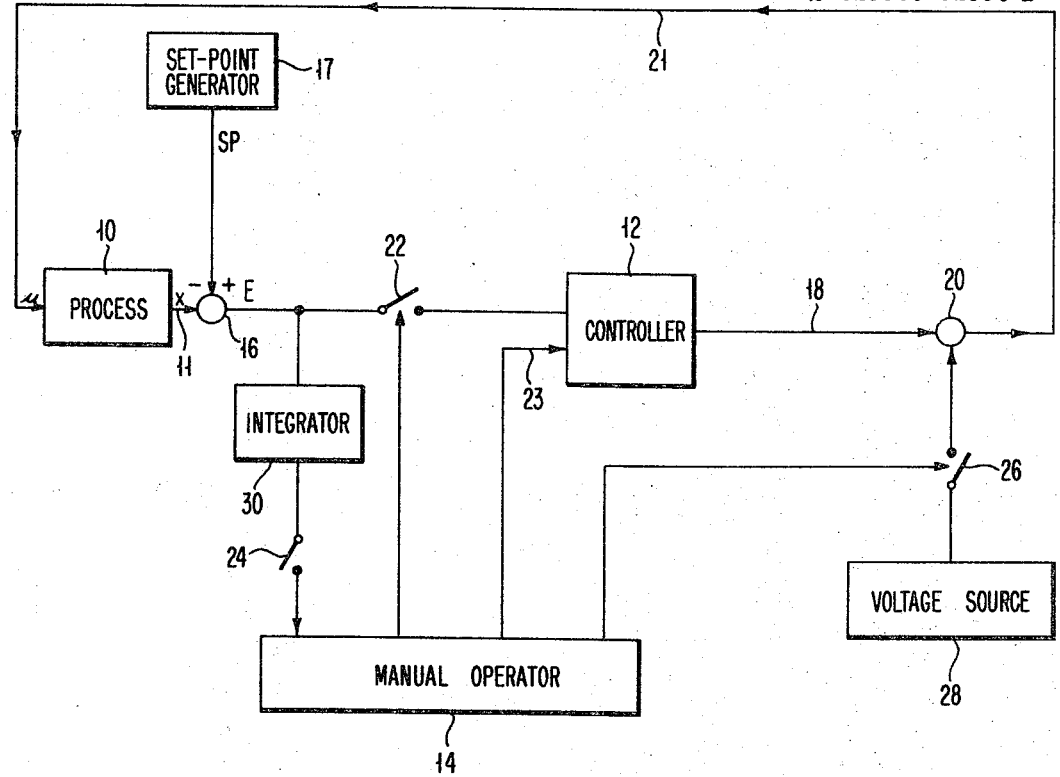
FIG. 1 shows, in block diagram form, a controlled process and an associated testing apparatus for practicing the novel method of my invention.

With reference to FIG. 1, it establishes an environment for the invention by showing a typical arrangement of a process and associated equipment for practicing the novel method of my invention. Process 10 is being controlled by controller 12 with the aid of a manual operator 14. A signal X representing the present state of a controlled variable for process 10 is generated by appropriate sensors and transducers on line 11. Signal X is supplied to summing junction 16. Similarly, a signal SP representing a process setpoint for that controlled variable is supplied from setpoint signal generator 17 to summing junction 16. A comparison is made between signals X and SP with the resultant error signal E being generated by subtracting X from SP at the summing junction 16. Error signal E is supplied through switch 22, now closed under the direction of manual operator 14, to controller 12. Controller 12 generates a control signal $f(E)$ on line 18 which is then applied through a summing circuit 20 to process 10 in order to adjust the measured variable.

Continuing with reference to FIG. 1, test apparatus (including switches 22, 24, 26, voltage source 28, and integrator 30) for practicing the method of this invention is provided. The function and structure of the exemplary test apparatus will be described more fully hereinafter. However, at this stage, it is sufficient to note that the test apparatus enables a comparison to be made between the integrals of several output deviations (or, phrased another way, controlled variable deviations) so as to obtain an indication of the process gain at different times.

Figure 2:
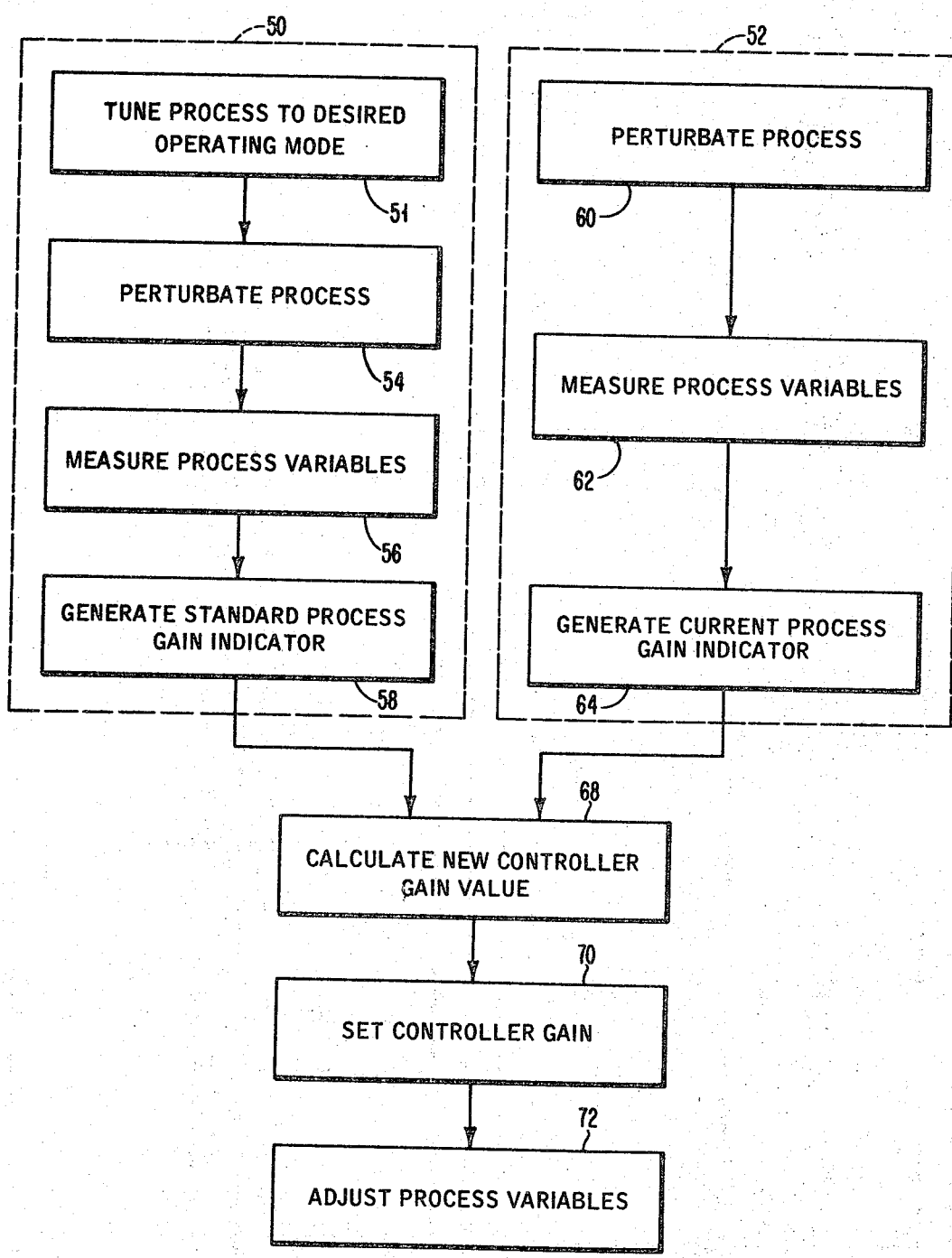
FIG. 2 shows, in outline form, the novel steps of my invention.

FIG. 2 shows, in outline form, the series of steps necessary to practice the novel method of my invention. Dotted lines 50 circumscribe the four principal steps for establishing a standard, or reference, indicator of process gain and, correspondingly, a reference value of loop gain under known conditions. With reference to box 51, it is necessary to first tune the process to some desired mode of operation so as to establish a reference value of loop gain, i.e., process gain times controller gain. This tuning operation can be done by methods known to prior art, such as that described in my copending U.S. patent application, Ser. No. 599,879, "Coefficient Tuning Method for Process Control Systems," filed on Dec. 7, 1966. Then, as noted in box 54, process 10 is perturbated with a standard test signal, and process variables are then measured as shown in box 56. A process gain indicator is then obtained by integrating the measured process variable value for a discrete time period as shown in box 58. The process is then returned to closed loop control until it is desired to adjust the controller gain. Dotted lines 52 circumscribe similar steps noted in boxes 60, 62, 64 for obtaining a current indicator of process gain; current is used here with reference to a time base. Both the reference gain indicator and the current gain indicator are employed in the step of box 68 for calculating a new controller gain value. That new value is set as shown in box 70 and, as noted in box 72, the process variables are adjusted accordingly. All these operations will be made clearer by an example presented below. However, they are highlighted at this point in order to give the reader some idea of the nature of my invention.

FIG. 1 will be used once again to describe more fully how the novel method of my invention can be practiced. Returning then to FIG. 1, note that initially it is necessary to obtain a standard value of loop gain. To accomplish this, process 10 is first tuned to some desired mode of operation by controller 12 as noted before. Then, the standard process gain indicator is determined by opening switch 22 under the direction of manual operator 14 so as to remove controller 12 from the loop. Manual operator 14 then closes switch 26 and a test signal is supplied from voltage source 28 through switch 26, and summing circuit 20. Since summing circuit 20 is receiving a constant (steady state) signal on line 18, the sum of the two signals is fed back on line 21 to process 10, thereby effecting, or changing, error signal E generated at summing junction 16. The change in error signal E is a function of the gain of process 10. This output is integrated by integrator circuit 30 through closed switch 24 and can be measured by operator 14. This measured value of the change in output is recorded or stored. It could also be displayed as a quantitative value for notation and control action by the operator 14. At this point, the steps outlined in dotted lines 50 of FIG. 2 have been completed. Manual operator 14 then closes switch 22 and process 10 is allowed to operate, under the control of controller 12, until such time as a determination of the process gain and correction of the controller gain is to be made.

Continuing on with a description of the steps necessary in the method of my invention, routine control of process 10 continues until the next determination of gain is to be made. At that time, operator 14 samples error signal E at summing junction 16 through opened and closed switch 24 in order to determine that process 10 is in a suitable condition for testing. That is, process 10 must be operating within certain predetermined limits so as to insure that it is stable enough for testing. If this is true, manual operator 14 opens switch 22, thereby "open-looping" process 10, and closes switch 26. A test signal of known value and of the same value as that used to establish the standard gain measurement is supplied once again from voltage source 28 through switch 26, and summing circuit 20, along line 21 to process 10. The change in output from process 10 is reflected by a change in the error signal E at the summing junction 16. This change is noted, once again, by integrator 30 and operator 14 through now closed switch 24. At this point, the steps outlined in dotted lines 52 of FIG. 2 have been completed. The second integral (or sum) so noted can be stored in a memory device, not shown for simplicity. Operator 14 now has available the factors representative of the standard, as well as the current, value of process gain. Operator 14 can now establish a ratio of the second integral to the first integral thereby yielding an effective indication, or measure, of the current gain of process 10. The calculation of the current gain $K_{current}$ of process 10 can be obtained according to the following equation:

$$K_{current} = \frac{K_{standard}}{\int_{t=0}^{T} E_{standard} dt} \cdot \int_{t=0}^{T} E_{test} dt \quad (1)$$

where:

$K_{standard}$ = a standard, or reference, gain value for process 10;

$E_{standard}$ = samples of error signal E obtained through switch 24 under standard conditions;

$E_{test}$ = samples of error signal E taken through switch 24 under test conditions.

$t$ = time $T$ = length of testing period

If it is desired to maintain the total loop gain constant, then the desired controller gain $K_c$ can be determined from a known controller gain under the reference condition called $K_c$ standard; this known controller gain can also be stored from prior operations:

$$K_{controller\ desired} = K_{controller\ standard} \frac{\int_{t=0}^{T} E_{standard} dt}{\int_{t=0}^{T} E_{test} dt} \quad (2)$$

where:

$E_{standard}$
$E_{test}$ are defined above. At this point, the operations of box 68 in FIG. 2 have been completed. This indication can be displayed and suitable control action taken manually. Alternatively, operator 14 can supply a controller gain setting signal along line 23 to controller 12. Box 70 of FIG. 2 has now been satisfied. Upon selection of the proper control action in accordance with the present gain K of process 10, operator 14 closes switch 22 and opens switch 26 so as to bring controller 12 back into operation. The control loop is thereby closed. Box 72 of FIG. 2 is now satisfied as well.

Figure 3:
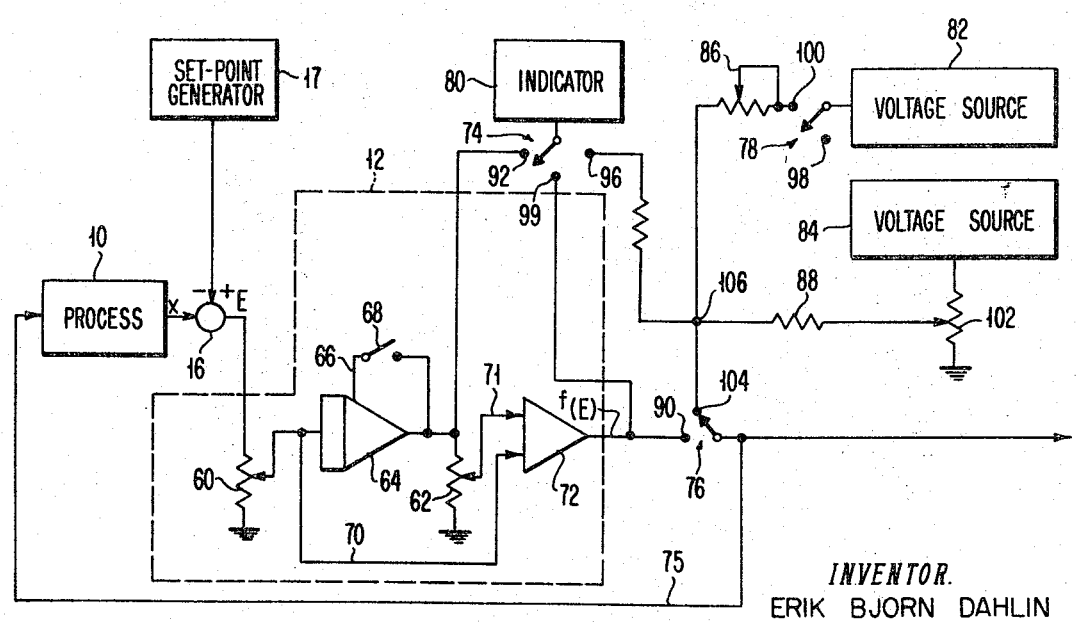
FIG. 3 shows, partially in block diagram form and partially in schematic, a physical process and associated analog control apparatus of a particular type for practicing the method of this invention.

FIG. 3 shows, in more detail, apparatus for practicing an embodiment of this invention wherein the method utilizes conventional analog controllers and manually operated switches. This figure is included to demonstrate that the method of this process is not restricted to being practiced manually or on a computer. Elements like those in FIG. 1 are numbered in the same manner; for example, process 10, summing junction 16 and controller 12 are present in FIG. 3. In FIG. 3, a proportional-reset type of control action is shown with a potentiometer 60 performing the proportional control action and a potentiometer 62, in cooperation with integrator 64, performing the reset control action. A feedback circuit 66 is established across integrator 64 with switch 68 in that circuit for the purpose of setting the output of the integrator 64 to zero. Summing amplifier 72 accepts signals developed across potentiometer 60 on line 70 and potentiometer 62 on line 71. A control signal $f(E)$ is developed across summing amplifier 72 and fed back to process 10 on line 75 when switch 76 is closed.

Several additional multiposition switches 74, 76 and 78 are provided as well as some gain display apparatus, such as an indicator dial 80 to practice this embodiment of my invention. Dial 80 is used not only for evaluation of the process gain indicator, but also for assisting in manual-automatic transfer as will be described. Test apparatus comprises, in addition to multiposition switch 78, a first voltage source 82, a second voltage source 84, an adjustable resistor 86, a resistor 88, and a potentiometer 102.

With continued reference to FIG. 3, the necessary steps for determining the process gain can now be described. Initially, process 10 is operating and providing a signal X to summing junction 16. A setpoint signal SP is similarly provided to summing junction 16 from setpoint generator 17 and compared to process signal X. Error signal E is generated by summing junction 16. Controller 12 performs, in this example, a proportional-reset type of control operation upon error signal E, switch 68 is open and switch 76 contacts terminal 90 at this time. A control signal $f(E)$ is thereby developed and returned to process 10 through switch 76 and line 75. Process 10 is then adjusted in accordance with the control signal $f(E)$.

In order to properly describe the operation of this embodiment of the invention, assume that some standard indication of the gain of the control loop (process gain times controller proportional gain) has been obtained and displayed on indicator dial 80. Before a gain determination is to be made, switch 68 is opened, switch 74 contacts terminal 99, switch 76 contacts terminal 90, and switch 78 contacts terminal 98 so that voltage source 82 is not connected with the remainder of the equipment. Operation of the noted switches may either be manually initiated or by control signals from control logic not not shown for simplicity's sake. With this arrangement and setting of the switches, process 10 is undergoing control by controller 12 in a normal fashion.

When it is desired to determine the gain of process 10, switch 74 is placed in contact with terminal 96 bringing voltage source 84 into circuit with indicator dial 80. Manually adjustable potentiometer 102, connected to source 84, is manipulated until indicator dial 80 provides a reading matching that obtained previously when process 10 was operating in a normal manner under the direction of controller 12. Switch 76 is then set to terminal 104. Indicator dial 80 is connected across integrator 64 by setting switch 74 to terminal 92. Integrator 64 is reset to zero by closing switch 68 so as to feedback its output along line 66. As switch 68 is opened, switch 78 contacts terminal 100 bringing voltage source 82 in across the adjustable resistor 86. Current available from voltage source 82 is added at junction 106 to the current available from voltage source 84 across resistor 88. This current is fed back as an input to process 10 through switch 76, terminal 104 and along line 75. Error signal E, generated by summing junction 16, is integrated for a fixed period of time by integrator 64, and a reading on indicator dial 80 is obtained. This reading represents a second integral due to the output deviation created by the test pulse generated by test apparatus according to the prior steps.

That reading from indicator dial 80 representing a second integral can then be compared to a prior, or predetermined, indicator reading, and a ratio of current gain to predetermined gain can thereby be determined. If the reference readout from indicator dial 80 is identified as $C_R$ and the actual readout identified as C, the desired controller gain K is related to the actual controller gain $K_{actual}$ according to the following equation:

$$K_{\text{controller desired}} = \frac{C_R}{C} K_{\text{controller actual}} \quad (3)$$

Having completed a description of FIG. 3, note that as a further embodiment of this invention, the method can be simplified if one knows the dynamics of a process 10. The value of the ratio:

$$\frac{K_{\text{standard}}}{\int_{t=0}^{T} E_{\text{standard}} dt} \quad (4)$$

which appeared in Equation 1 can then be computed from measured constants. $K_{standard}$ does not have to be known. The experiment to determine the standard value of process gain then does not have to be conducted; only the test which gives $$\int_{t=0}^{T} E_{\text{test}} dt \quad (5)$$

need be performed.

The method will be illustrated with an example. Assume the process transfer function is known to be:

$$\frac{x(s)}{u(s)} = K_{\text{standard}} \frac{A}{S+A} \quad (6)$$

where:
$x(s)$ =measured values of process output;
$u(s)$ =measured values of process input;
S is the Laplace transform symbol;
A is a known parameter representing the inverse of the time constant for the process; and
$K_{standard}$=process gain which need not to be known.

If the process input $u(s)$ (test signal) is a step function of magnitude B then $$u(s) = \frac{B}{S} \quad (7)$$

The time function $x(s)$ (the process output deviation for the setpoint) for the test signal input can be determined from the inverse Laplace transform:

$$E(t) = L^{-1}\left[K_{\text{standard}} \frac{A}{S+A} \frac{B}{S}\right] = K_{\text{standard}} \cdot B[1-e^{-At}] \quad (8)$$

The integral of $x(t)$ for the interval O–T is determined next:

$$\int_0^T E(t)dt = \int_0^T K_{\text{standard}} \cdot B[1-e^{-At}]dt$$

$$= B \cdot K_{\text{standard}}\left[T + \frac{1}{A}e^{-At} - \frac{1}{A}\right] \quad (9)$$

Rearranging terms in Equation 9:

$$\frac{K_{\text{standard}}}{\int_0^T Edt} = \frac{1}{B\left[T + \frac{1}{A}e^{-At} - \frac{1}{A}\right]} = \text{Computable constant} \quad (10)$$

All terms in Equation 10 are known or measurable. Thus, a value for $$\frac{K_{\text{standard}}}{\int_0^T Edt}$$

can be calculated.

For other transfer functions, one can similarly eliminae the need for conducting the reference experiment by performing computation using known time constants of the process. Thus, the step of measuring the standard indicator value can be accomplished by performing a simple calculation.

As one embodiment of my invention, it is possible to practice a portion of the novel method of my invention with the assistance of an associated digital computer, particularly when that digital computer is performing direct digital control of the process. In that instance, certain process constants are estimated, or identified, in accordance with known techniques: see, for example, my copending U.S. application, Ser. No. 599,878, filed Dec. 7, 1966 and entitled, "Parameter Identification Method for Process Control Systems." A standard gain value is then obtained by calculation or summing certain error signals. Subsequently, when a current gain determination is to be made, a second series of error signals can be summed. The second gain value is then compared to the standard gain value as in the first embodiment, thereby providing the information necessary for the associated digital computer to vary the control algorithm stored therein and generate new control signals.

Additionally, it may be desirable to sometimes evaluate the product of process gain and a pole, or characteristic frequency, of the process rather than the process gain alone. The invention can be adapted readily to operate on that quantity as well, by substituting an indication of that product for the process gain indicator.

My invention thus includes a new method of interrelating measured and calculated variables in a process. It involves taking a series of physical measurements, performing certain mathematical operations on the values obtained by those measurements, and then adjusting certain variables in accordance with the results obtained from the computation. The computer program for performing the computation is not my invention. My invention is a control technique or, more explicitly, my invention is a method of adjusting the setting of a process variable in accordance with signals obtained from the process being controlled.

While the invention has been particularly shown and described with reference to preferred embodiments thereof, it will be understood that those skilled in the art that the foregoing and other changes in the form and details may be made therein without departing from the spirit and scope of the invention. In the following claims, the term "process" referes to the physical process 10 of FIG. 1 and "processor" refers to the means such as shown for accomplishing the physical process.

I claim:
1. A method of control of a processor and its associated controller selectably operating in a closed loop or open loop and including determining the gain of a process comprising the steps of:
operating said processor at the predetermined level operating said processor on an open loop basis;
impressing a first test signal upon said processor, thereby generating a first error signal;
integrating said first error signal, thereby obtaining a signal whose value is a standard indicator of process gain;
operating said processor on a closed loop basis;
operating said processor on an open loop basis;
applying a second test signal identical to said first test signal to said processor, thereby generating a second error signal;
integrating said second error signal, thereby providing a signal whose value is an indicator of the current process gain;
establishing a ratio of said current process gain indicator to said standard process gain indicator so as to identify said current process gain; and adjusting the gain of said associated controller so as to keep constant the product of process gain and controller gain.

2. The method of processor control comprising the steps recited in claim 1 and the additional steps of:
operating said processor on a closed loop basis;
generating a control signal from said controller; and
adjusting a processor variable in accordance with said control signal.

3. The method of control of a processor and its associated controller selectably operating a closed loop or open loop and including determining the gain of a process comprising the steps of:
tuning said process to the desired operating level operating said processor on an open loops basis so as to have a standard loop gain value;
impressing a first test signal onto said processor when said process is operating at said desired level, thereby generating a first error signal whose value represents process output deviation;
integrating said process output deviation caused by said first test signal, thereby generating a first reference gain signal;
operating said processor on a closed loop basis;
at a later time operating said processor on an open loop basis;
applying a second test signal resembling said first test signal to said processor while it is operating on an open loop basis, thereby generating a second error signal whose value represents the resultant process output deviation;
integrating said resultant process output deviation caused by said second test signal, thereby generating a second gain signal;
comparing said second gain signal to said first gain signal to obtain a relative measure of process gain; and
adjusting the gain of said associated controller so as to keep constant the product of process gain and controller gain.

4. The method of processor control comprising the steps recited in claim 3, and the additional steps of:
operating said processor on a closed loop basis;
generating a control signal from said controller; and
adjusting a processor variable in accordance with said control signal.

5. The method of control of a processor and its associated controller selectably operating in a closed loop or open loop and including determining the desired gain for said process controller comprising the steps of:
tuning said process to the desired operating level operating said processor on an open loop basis so as to have a standard loop gain value;
impressing a first test signal onto said processor when said process is operating at said desired level, thereby generating a first error signal whose value represents process output deviation;
integrating said process output deviation caused by said first test signal, thereby generating a first reference gain signal;
operating said processor on a closed loop basis;
at a later time operating said processor on an open loop basis;
applying a second test signal identical to said first test signal to said processor while said process is operating on an open loop basis, thereby generating a second error signal whose value represents the resultant process output deviation;
integrating said resultant process output deviation caused by said second test signal, thereby generating a second gain signal;
comparing said second gain signal to said first gain signal to obtain a relative measure of current process gain;
generating a standard controller gain signal representing the value of said controller gain under standard conditions; and
generating a desired controller gain signal for said associated controller, said signal representing the product of said standard controller gain signal and said first process gain signal divided by said second process gain signal.

6. A method of processor control comprising the steps recited in claim 5 and the aditional step of:
setting the gain of said associated controller in response to said desired controller gain signal.

7. A method of controlling the gain of a process under the control of a digital computer connected to a process controller, comprising:
(a) generating a first error signal whose value represents the resultant process output deviation under a given set of conditions;
(b) sampling said first error signal repetitively so as to eliminate process noise disturbances;
(c) summing the error signal samples according to the expression:

$$\sum_{i=1}^{N} E_i$$

where:

$E_i$ is the error signal;
N is the number of samples;

(d) generating a gain signal $K_{standard}$ representing the gain of said process under said given set of conditions;
(e) operating said controller to operate said process on a closed-loop basis;
(f) operating said controller to operate said process on an open-loop basis;
(g) operating said controller to impress a test signal onto said process;
(h) generating a second error signal whose value represents the resultant process output deviation responsive to said test signal;
(i) sampling said second error signal repetitively so as to eliminate process noise disturbances;
(j) summing said last mentioned samples according to the expression:

$$\sum_{i=1}^{N} E_i'$$

where:

$E_i$ is said second error signal;
N is the number of samples taken of said second error signal; and (k) manifesting a desired controller gain setting K' according to the relationship:

$$K' = K_{standard} \frac{\sum_{i=1}^{N} E_i}{\sum_{i=1}^{N} E_i'}$$

and; wherein the steps a–k are accomplished by said digital computer.

8. A method of controlling the gain of a process comprising the steps recited in claim 7 under the control of said digital computer and the following steps:
said computer generating a controller gain setting signal in response to said manifestation;
said process controller setting said controller gain in response to said controller gain setting signal; and said process controller generating a control signal in accordance with said new controller gain setting.

References Cited

UNITED STATES PATENTS 3,109,970  11/1963  Smyth _____ 235—150.1

OTHER REFERENCES

"A Parameter-Perturbation Adapting Control System," IRE Transactions on Automatic Control, May 1961, pp. 154–162.

EUGENE G. BOTZ, Primary Examiner